United States Patent
Kim

(10) Patent No.: US 10,211,458 B2
(45) Date of Patent: Feb. 19, 2019

(54) METHOD FOR PREPARING ELECTRODE ACTIVE MATERIAL SLURRY, AND ELECTRODE ACTIVE MATERIAL SLURRY PREPARED BY METHOD

(71) Applicant: LG CHEM, LTD., Seoul (KR)

(72) Inventor: Young-Jae Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 151 days.

(21) Appl. No.: 14/762,720

(22) PCT Filed: Dec. 19, 2014

(86) PCT No.: PCT/KR2014/012610
§ 371 (c)(1),
(2) Date: Jul. 22, 2015

(87) PCT Pub. No.: WO2015/093904
PCT Pub. Date: Jun. 25, 2015

(65) Prior Publication Data
US 2015/0364749 A1   Dec. 17, 2015

(30) Foreign Application Priority Data

Dec. 19, 2013  (KR) .................. 10-2013-0159395
Dec. 19, 2014  (KR) .................. 10-2014-0184586

(51) Int. Cl.
*H01M 4/505*   (2010.01)
*H01M 4/1391*  (2010.01)
(Continued)

(52) U.S. Cl.
CPC ........... *H01M 4/505* (2013.01); *H01M 4/139* (2013.01); *H01M 4/1391* (2013.01);
(Continued)

(58) Field of Classification Search
CPC ........................................................ H01M 4/04
(Continued)

(56) References Cited

U.S. PATENT DOCUMENTS

| | | |
|---|---|---|
| 2003/0113627 A1 | 6/2003 | Choi et al. |
| 2006/0257738 A1 | 11/2006 | Kim et al. |
| 2011/0269015 A1 | 11/2011 | Cho et al. |
| 2013/0062571 A1 | 3/2013 | Lee et al. |
| 2013/0089780 A1 | 4/2013 | Uezono |

FOREIGN PATENT DOCUMENTS

| | | |
|---|---|---|
| CN | 101136467 A | 3/2008 |
| CN | 101752550 A | 3/2008 |

(Continued)

OTHER PUBLICATIONS

International Search Report issued in PCT/KR2014/012610, dated Mar. 30, 2015.

*Primary Examiner* — Khanh T Nguyen
(74) *Attorney, Agent, or Firm* — Birch, Stewart, Kolasch & Birch, LLP

(57) ABSTRACT

The present invention relates to a method for preparing electrode active material slurry, and an electrode active material slurry prepared by the method, the method comprising the steps of: (S1) mixing a conductive agent and a first dispersion medium to thus prepare a conductive agent dispersion, and mixing an electrode active material and a second dispersion medium to thus prepare an electrode active material dispersion; and (S2) dispersing the conductive agent dispersion while adding the same to the electrode active material dispersion.

14 Claims, 4 Drawing Sheets

(51) Int. Cl.
*H01M 4/1393* (2010.01)
*H01M 4/1395* (2010.01)
*H01M 4/139* (2010.01)
*H01M 4/62* (2006.01)
*H01M 4/525* (2010.01)

(52) U.S. Cl.
CPC ....... *H01M 4/1393* (2013.01); *H01M 4/1395* (2013.01); *H01M 4/624* (2013.01); *H01M 4/525* (2013.01); *H01M 4/621* (2013.01); *H01M 4/623* (2013.01); *H01M 4/625* (2013.01)

(58) Field of Classification Search
USPC ................ 429/211, 241; 174/254; 252/182.1
See application file for complete search history.

(56) References Cited

FOREIGN PATENT DOCUMENTS

| | | | | |
|---|---|---|---|---|
| EP | 1 294 040 A2 | | 3/2003 | |
| JP | 2006-302617 | * | 11/2006 | .............. H01M 4/04 |
| JP | 2006-302617 A | | 11/2006 | |
| JP | 2009-283232 A | | 12/2009 | |
| JP | 2013-84397 A | | 5/2013 | |
| JP | 2013-168484 | * | 8/2013 | .............. H01G 11/22 |
| JP | 2013-168484 A | | 8/2013 | |
| KR | 10-0508570 B1 | | 8/2005 | |
| KR | 10-1166019 B1 | | 7/2012 | |
| KR | 10-2013-0029265 A | | 3/2013 | |

* cited by examiner

METHOD FOR PREPARING ELECTRODE ACTIVE MATERIAL SLURRY, AND ELECTRODE ACTIVE MATERIAL SLURRY PREPARED BY METHOD

TECHNICAL FIELD

The present disclosure relates to a method of preparing an electrode active material slurry and an electrode active material slurry prepared by the method, and more particularly, to a method of preparing an electrode active material slurry that prepares a conductive agent dispersion and an electrode active material dispersion and then mixes them to prepare an electrode active material slurry having the full zeta potential while maintaining a stable state of a mixed material, and an electrode active material slurry prepared by the method.

This application claims priority to Korean Patent Application No. 10-2013-0159395 filed in the Republic of Korea on Dec. 19, 2013 and Korean Patent Application No. 10-2014-0184586 filed in the Republic of Korea on Dec. 19, 2014, which is incorporated herein by reference.

BACKGROUND ART

Recently, there has been an increasing interest in energy storage technology. As the application field of energy storage technology is extended to mobile devices such as mobile phones, camcorders, laptop computers, and even medium and large size batteries in use for electric vehicles such as hybrid electric vehicles (HEVs), plug-in hybrid electric vehicles (PHEVs), and electric vehicles (EV), the demand for high energy density of batteries used as a power source of electronic devices is growing. Lithium secondary batteries are the best battery which can meet the demand, and recently, many studies on them are being intensively made.

Currently, an electrode for use in a secondary battery is produced by coating a high concentration slurry on aluminum and copper foils, the high concentration slurry prepared by individually adding an electrode active material, a conductive agent, a binder and a solvent, and mixing them. The individual addition and mixing is because different characteristics are required for each lithium secondary battery product. However, the properties of the slurry significantly affect the electrode, so a mixing process of the slurry is a particularly important factor in producing the electrode.

Further, as a method of preparing an electrode active material slurry, a high viscosity mixing method may be used. This is a method which increases the viscosity a mixture of an electrode active material and a conductive agent to the maximum, adding excess solvents, and mixing them to prepare an electrode active material slurry, and has a disadvantage of reduced stability of the electrode active material slurry or wear of a mixer due to stress acting to the mixer.

DISCLOSURE

Technical Problem

The present disclosure is directed to providing a method of preparing an electrode active material slurry that prepares a conductive agent dispersion and an electrode active material dispersion and then mixes them to prepare an electrode active material slurry having the full zeta potential while maintaining a stable state of a mixed material, and an electrode active material slurry prepared by the method.

Technical Solution

To achieve the above object, according to one aspect of the present disclosure, there is provided a method of preparing an electrode active material slurry, including (S1) mixing a conductive agent and a first dispersion medium to prepare a conductive agent dispersion, and mixing an electrode active material and a second dispersion medium to prepare an electrode active material dispersion, and (S2) dispersing the conductive agent dispersion while adding the conductive agent dispersion to the electrode active material dispersion.

In this instance, at the step S1, the conductive agent dispersion may contain 5 wt % to 20 wt % of the conductive agent dispersed therein.

Also, at the step S1, the electrode active material dispersion may contain 60 wt % to 90 wt % of the electrode active material dispersed therein.

Also, at the step S1, the conductive agent dispersion may contain 5 wt % to 20 wt % of the conductive agent dispersed therein and the electrode active material dispersion may contain 60 wt % to 90 wt % of the electrode active material dispersed therein, and at the step S2, 10 to 40 parts by weight of the conductive agent dispersion may be added to and dispersed in the electrode active material dispersion based on 100 parts by weight of the electrode active material dispersion.

On the other hand, a binder may be further included in the conductive agent dispersion at the step S1, a binder may be further included in the electrode active material dispersion at the step S1, or a binder may be further included at the step S2.

In this instance, the binder may be any one selected from the group consisting of polyvinylidene fluoride-hexafluoropropylene (PVDF-co-HFP), polyvinylidene fluoride (PVDF), polyacrylonitrile, polymethyl methacrylate, styrene butadiene rubber (SBR), and carboxyl methyl cellulose (CMC), or mixtures thereof.

Also, the conductive agent may include any one selected from the group consisting of carbon black, graphite, carbon fibers, carbon nanotubes, acetylene black, Ketjen Black, and Super P, or mixtures thereof.

Also, the first dispersion medium may include any one selected from the group consisting of organic solvents with a solubility parameter ($\delta$) constant value higher than or equal to 10, or mixtures thereof.

Also, the first dispersion medium may include water, N-Methyl-2-pyrrolidone, or mixtures thereof.

Also, the electrode active material may be a positive electrode active material or a negative electrode active material.

Here, the positive electrode active material may include lithium containing oxide.

In this instance, the lithium containing oxide may be lithium containing transition metal oxide, and the lithium containing transition metal oxide may be any one selected from the group consisting of $Li_xCoO_2$ ($0.5<x<0.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\le y<1$), $Li_xNi_{1-y}Mn_yO_2$ ($0.5<x<1.3$, $0\le y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), or mixtures thereof.

Also, the negative electrode active material may include a lithium metal, a carbon material, a metal compound, and mixtures thereof.

Here, the metal compound may be a compound containing any one type of metal element selected from the group consisting of Si, Ge, Sn, Pb, P, Sb, Bi, Al, Ga, In, Ti, Mn, Fe, Co, Ni, Cu, Zn, Ag, Mg, Sr, and Ba, or compounds or mixtures of two or more types of metal elements.

Also, the second dispersion medium may be the same as the first dispersion medium.

On the other hand, the step S2 may include additionally feeding a third dispersion medium while adding the conductive agent dispersion to the electrode active material dispersion.

Here, the third dispersion medium may be the same as the first dispersion medium.

According to another aspect of the present disclosure, there is provided an electrode active material slurry prepared by the preparing method of the present disclosure.

Advantageous Effects

According to the present disclosure, a conductive agent dispersion and an electrode active material dispersion are prepared and then mixed to prepare an electrode active material slurry having the full zeta potential while maintaining a stable state of a mixed material, so a conductive agent and an electrode active material may be uniformly dispersed in the electrode active material slurry as compared to a related art.

Further, according to the present disclosure, even though a conductive agent having poor dispersibility is used, the conductive agent may be uniformly dispersed, and even when the conductive agent is present in a lower amount than a related art, a degradation inhibitory effect for cycle characteristics of a cell is produced.

BRIEF DESCRIPTION OF THE DRAWINGS

The accompanying drawings illustrate preferred embodiments of the present disclosure and, together with the foregoing disclosure, serve to provide further understanding of the technical aspect of the present disclosure. However, the present disclosure is not to be construed as being limited to the drawings.

MODE FOR CARRYING OUT THE INVENTION

Figure 1:
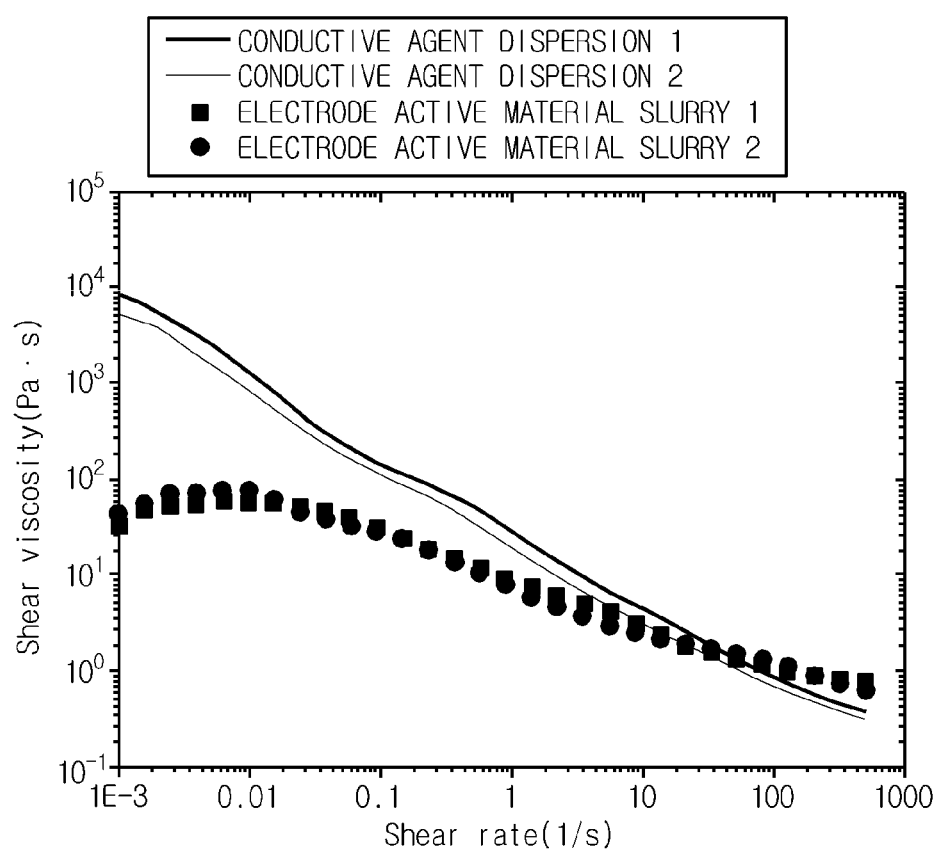
FIG. 1 is a graph showing viscosity vs shear rate for a conductive agent dispersion and an electrode active material slurry prepared according to an example of the present disclosure.

Hereinafter, the present disclosure will be described in detail. It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Also, the configurations illustrated in the drawings and the embodiments are just preferable examples for the purpose of illustrations only, not intended to limit the scope of the disclosure, so it should be understood that other equivalents and modifications could be made thereto without departing from the scope of the disclosure.

A method of preparing an electrode active material slurry according to the present disclosure is as follows.

First, a conductive agent and a first dispersion medium are mixed to prepare a conductive agent dispersion, and an electrode active material and a second dispersion medium are mixed to prepare an electrode active material dispersion (S1).

Conventionally, an electrode active material, a conductive agent, a binder, and a solvent were individually added and then mixed to prepare an electrode active material slurry, or excess solvents were added to a mixture of an electrode active material and a conductive agent after maximizing the viscosity of the mixture and then mixed to prepare an electrode active material slurry, but according to this method, the stability of the electrode active material slurry reduces, or due to stress acting on a mixer, the mixer may be worn out.

The present disclosure prepares each of a conductive agent dispersion and an electrode active material dispersion, and then mixes them to prepare an electrode active material slurry having a full zeta potential while maintaining a stable state of a mixed material, so the conductive agent and the electrode active material are uniformly dispersed in the electrode active material slurry as opposed to the related art.

Further, the present disclosure allows for uniform dispersion of a conductive agent having poor dispersibility characteristics that could not be conventionally used, and prevents the degradation of cycle characteristics and discharge characteristics of a cell even when the conductive agent is present in a lower amount than the related art.

In this instance, at step S1, 5 wt % to 20 wt % of the conductive agent may be dispersed in the conductive agent dispersion.

Because the conductive agent has a very small particle size as compared to the electrode active material and a very small volume density as compared to the dispersion medium, when 20 wt % or more of the conductive agent is present, the volume content of the conductive agent in the conductive agent dispersion increases more than a predetermined level, and uniform dispersion in the conductive agent dispersion is not accomplished. That is, as the content of the conductive agent in the conductive agent dispersion becomes higher, the conductive agent may reduce in dispersibility. Thus, to reduce the content of the conductive agent, it is necessary to relatively increase the content of the dispersion medium, and when the conductive agent is dispersed within the content range, dispersibility of the conductive agent may be uniformly maintained.

On the other hand, because the electrode active material has a larger particle size than the conductive agent and a higher volume density than the dispersion medium, a higher mass of the electrode active material than the conductive agent may be uniformly dispersed in the dispersion medium. That is, even when 60 wt % to 90 wt % of the electrode active material is dispersed in the electrode active material dispersion, a predetermined level of dispersibility may be maintained.

In this instance, a binder may be further included in the conductive agent dispersion at step S1 or the electrode active material dispersion at step S1, or a binder may be further included at step S2.

Here, the binder acts to bind the electrode active material to an electrode current collector and interconnect the electrode active materials, and binders being commonly used may be used without limitation.

Various types of binders are available, for example, polyvinylidene fluoride-hexafluoropropylene (PVDF-co-HFP), polyvinylidene fluoride (PVDF), polyacrylonitrile, polymethyl methacrylate, styrene butadiene rubber (SBR), and carboxyl methyl cellulose (CMC).

Also, the conductive agent is not limited to a particular type if it is an electronically conductive material that does not cause a chemical change in a lithium secondary battery. Generally, carbon black, graphite, carbon fibers, carbon nanotubes, metal powder, conductive metal oxide, and organic conductive materials may be used, and conductive agent products currently on the market includes acetylene black series (commercially available from Chevron Chemical Company or Gulf Oil Company), Ketjen Black EC series (commercially available from Armak Company), Vulcan XC-72 (commercially available from Cabot Company), and Super P (commercially available from MMM). For example, acetylene black, carbon black, and graphite are available.

Also, the first dispersion medium may include any one selected from the group consisting of organic solvents with a solubility parameter ($\delta$) constant value higher than or equal to 10 or mixtures thereof, and may include water, N-Methyl-2-pyrrolidone or mixtures thereof, and when the exemplary solvent is used, the conductive agent may be dispersed more favorably.

On the other hand, the electrode active material may be a positive electrode active material or a negative electrode active material.

Here, the positive electrode active material may include lithium containing oxide, and the lithium containing oxide may be lithium containing transition metal oxide.

The lithium containing transition metal oxide may be, for example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0<y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3), or mixtures thereof. Also, the lithium containing transition metal oxide may be coated with a metal such as aluminum (Al) or metal oxide. Also, in addition to the lithium containing transition metal oxide, sulfide, selenide, and halide may be used as well.

Also, the negative electrode active material may include a lithium metal, a carbon material, and a metal compound that are capable of intercalating and deintercalating lithium ions, and mixtures thereof.

Specifically, the carbon material may include low crystallinity carbon and high crystallinity carbon. The low crystallinity carbon typically includes soft carbon and hard carbon, and the high crystallinity carbon typically includes high temperature baked carbon such as natural graphite, Kish graphite, pyrolytic carbon, mesophase pitch based carbon fiber, meso-carbon microbeads, Mesophase pitches, and petroleum or coal tar pitch derived cokes.

Here, the metal compound may include compounds containing at least one type of metal element such as Si, Ge, Sn, Pb, P, Sb, Bi, Al, Ga, In, Ti, Mn, Fe, Co, Ni, Cu, Zn, Ag, Mg, Sr, and Ba. These metal compounds may be used in any form, for example, simple substances, alloys, oxides ($TiO_2$ and $SnO_2$), nitrides, sulfides, borides, and alloys with lithium, but simple substances, alloys, oxides, and alloys with lithium may contribute to high capacity. Above all, when the metal compound contains at least one type of element selected from Si, Ge and Sn, and includes at least one type of element selected from Si and Sn, higher battery capacity may be achieved.

The second dispersion medium may be the same as the first dispersion medium, and thereby, the electrode active material may be dispersed more favorably.

Subsequently, the conductive agent dispersion is added to and dispersed in the electrode active material dispersion (S2).

Thereby, the conductive agent and the electrode active material may be dispersed in the electrode active material slurry more uniformly than ordinary.

Here, when the conductive agent dispersion contains 5 wt % to 20 wt % of the conductive agent dispersed therein and the electrode active material dispersion contains 60 wt % to 90 wt % of the electrode active material dispersed therein, 10 to 40 parts by weight of the conductive agent dispersion may be added to and dispersed in the electrode active material dispersion based on 100 parts by weight of the electrode active material dispersion.

Thereby, when the conductive agent uniformly dispersed in the conductive agent dispersion is added to the electrode active material dispersion, they are mixed while maintaining their dispersibility, and ultimately, the electrode active material and the conductive agent may be uniformly mixed.

In this instance, at step S2, a third dispersion medium may be additionally fed while the conductive agent dispersion being added to the electrode active material dispersion, to prepare a more stable electrode active material slurry.

Here, the third dispersion medium may be the same as the first dispersion medium or the second dispersion medium.

Hereinafter, preferred examples of the present disclosure will be described in detail for better understanding. However, the examples of the present disclosure may be modified in various ways, and they should not be interpreted as limiting the scope of the invention. The examples of the present disclosure are just for better understanding of the invention to persons having ordinary skill in the art.

1. Example 1

(1) Prepare a Conductive Agent Dispersion 20 g of carbon black as a conductive agent was dispersed in 125 g of NMP as a first dispersion medium to prepare a conductive agent dispersion (a ratio of solids: 13.8%).

To disperse the conductive agent difficult to disperse, various types of dispersion machines may be used, and typically milling equipment or a high speed dispersion machine such as a high pressure homogenizer is used.

In this embodiment, in the preparation of the conductive agent dispersion, the conductive agent dispersion was prepared by dispersing at 4,000 rpm for 20 minutes using a dispersion machine being generally used (homogenizer), and then dispersing at 15,000 rpm for 20 minutes using a high speed dispersion machine.

(2) Prepare an Electrode Active Material Dispersion 646.7 g of LiCoO$_2$ as a positive electrode active material was dispersed in 140.8 g of NMP as a second dispersion medium to prepare an electrode active material dispersion (a ratio of solids: 82.1%).

(3) Prepare an Electrode Active Material Slurry

The conductive agent dispersion was slowly added to and dispersed in the electrode active material dispersion to prepare an electrode active material slurry (a ratio of solids: 71.5%). In this instance, the electrode active material slurry was prepared by dispersing at 4,000 rpm for 60 minutes using a dispersion machine being generally used (homogenizer).

2. Example 2

(1) Prepare a Conductive Agent/Binder Dispersion 20 g of carbon black as a conductive agent was dispersed in 166.7 g of a binder solution containing dissolved PVDF (a ratio of solids: 8.0%) to prepare a conductive agent/binder dispersion (a ratio of solids: 17.9%). In this instance, the same method as the method of preparing a conductive agent dispersion in the example 1 was used.

(2) Prepare an Electrode Active Material Dispersion 633.3 g of LiCoO$_2$ as a positive electrode active material was dispersed in 112.4 g of NMP as a second dispersion medium to prepare an electrode active material dispersion (a ratio of solids: 85.0%).

(3) Prepare an Electrode Active Material Slurry

The conductive agent dispersion was slowly added to and dispersed in the electrode active material dispersion to prepare an electrode active material slurry (a ratio of solids: 71.5%). In this instance, the same method as the method of preparing an electrode active material slurry in the example 1 was used.

3. Comparative Example 1

20 g of carbon black as a conductive agent, 166.7 g of a binder solution containing dissolved PVDF (a ratio of solids: 8.0%), 633.3 g of LiCoO$_2$ as a positive electrode active material, and 112.4 g of NMP as a dispersion medium were mixed together and dispersed to prepare an electrode active material slurry (a ratio of solids: 71.5%).

4. Test Example—Analysis of Rheological Properties

The dispersibility and coating performance was determined through rheological property analysis of the conductive agent dispersion and the electrode active material slurry prepared using the same.

Figure 2:
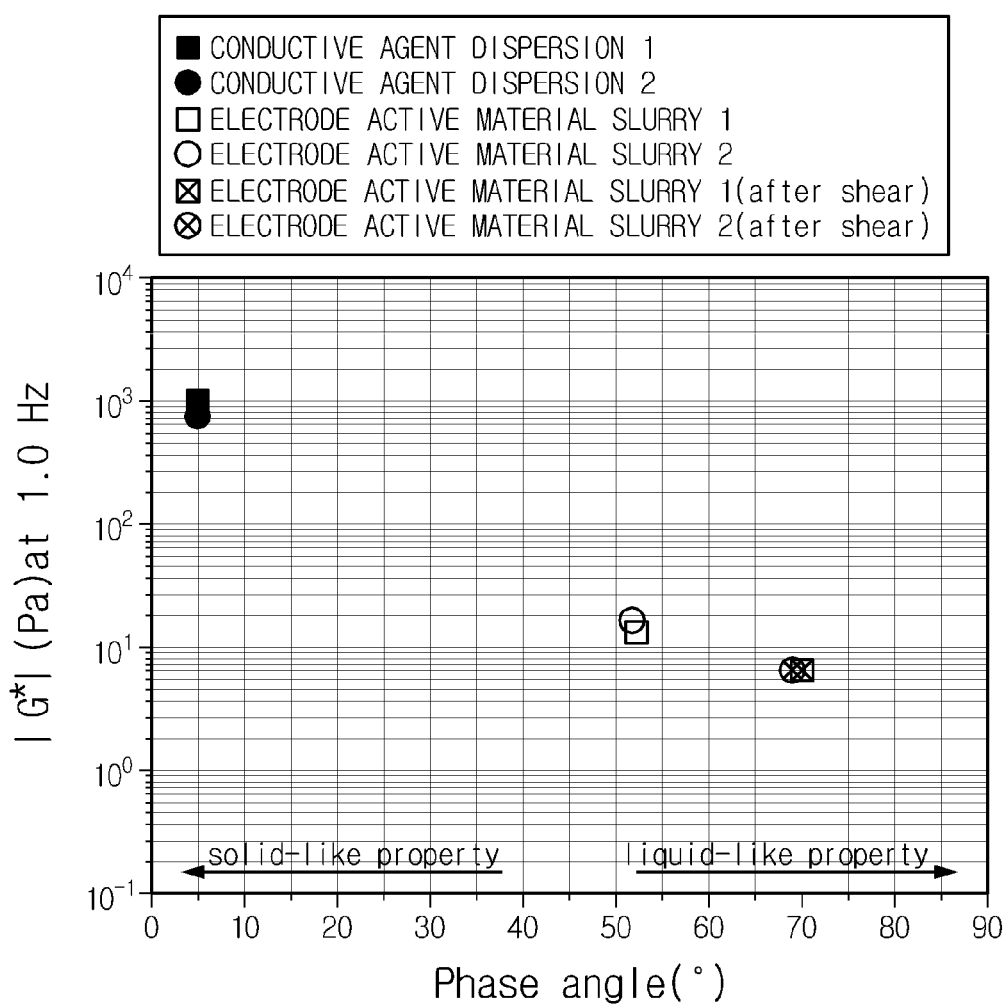
FIG. 2 is a graph showing a phase angle analysis result of a conductive agent dispersion and an electrode active material slurry prepared according to an example of the present disclosure.

FIG. 1 is a graph showing viscosity vs shear rate for the conductive agent dispersion containing a binder prepared in the example 2 and the electrode active material slurry prepared using the same, and FIG. 2 is a graph showing a phase angle analysis result of the conductive agent dispersion containing a binder prepared in the example 2 and the electrode active material slurry prepared using the same.

It is known that the coating performance is good when the viscosity of the slurry as an empirical value is from 10 Pa·s to 15 Pa·s (from 10,000 cP to 15,000 cP) at the shear rate of 1 (1/s). Referring to FIG. 1, it can be seen that the slurry of the example is present within the available viscosities.

On the other hand, through analysis of a phase angle among the rheological properties, when a phase angle value of the slurry is more than or equal to 450 after a predetermined amount of shear rate is applied, dispersibility may be determined as good. Referring to FIG. 2, because the slurry of the example shows a phase angle value more than or equal to 450 after an amount of shear rate is applied, it can be seen that the slurry has good dispersibility.

5. Test Example—Analysis of Cycle Characteristics of Cylindrical Cell

Figure 3:
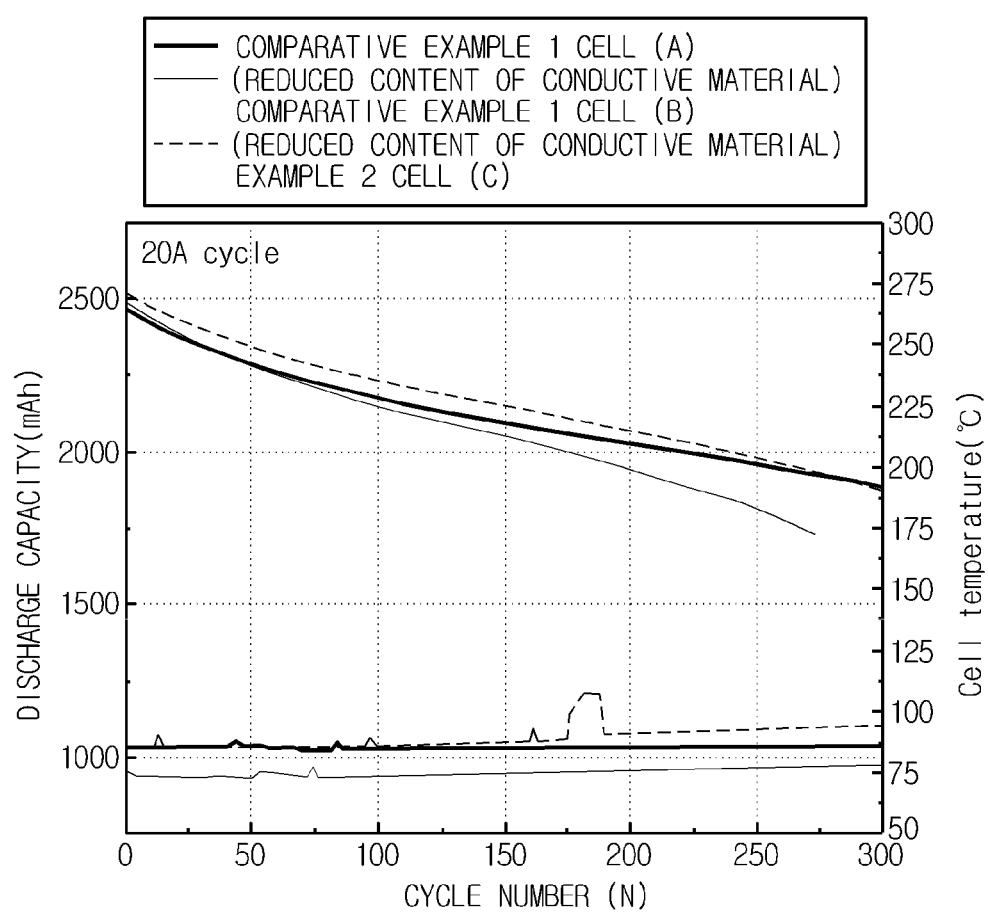
FIG. 3 is a graph showing evaluation of cycle characteristics of cylindrical cells using electrode active material slurries according to Example and Comparative example.

FIG. 3 is a graph showing evaluation of cycle characteristics of a cylindrical cell (A) using the electrode active material slurry prepared in the comparative example 1, and a cylindrical cell (B) and a cylindrical cell (C) using each electrode active material slurry prepared by the same methods as the methods of the comparative example 1 and the example 2, respectively, with the content of conductive agent reduced by 2.97%.

Referring to FIG. 3, when compared to the A cell, the B cell has a reduction in cycle characteristics due to the reduced content of conductive agent, while the C cell has a reduced content of conductive agent, but the cycle characteristics of the cell are found equal to or better than the A cell.

6. Test Example—Analysis of Discharge Characteristics at Room Temperature

Figure 4:
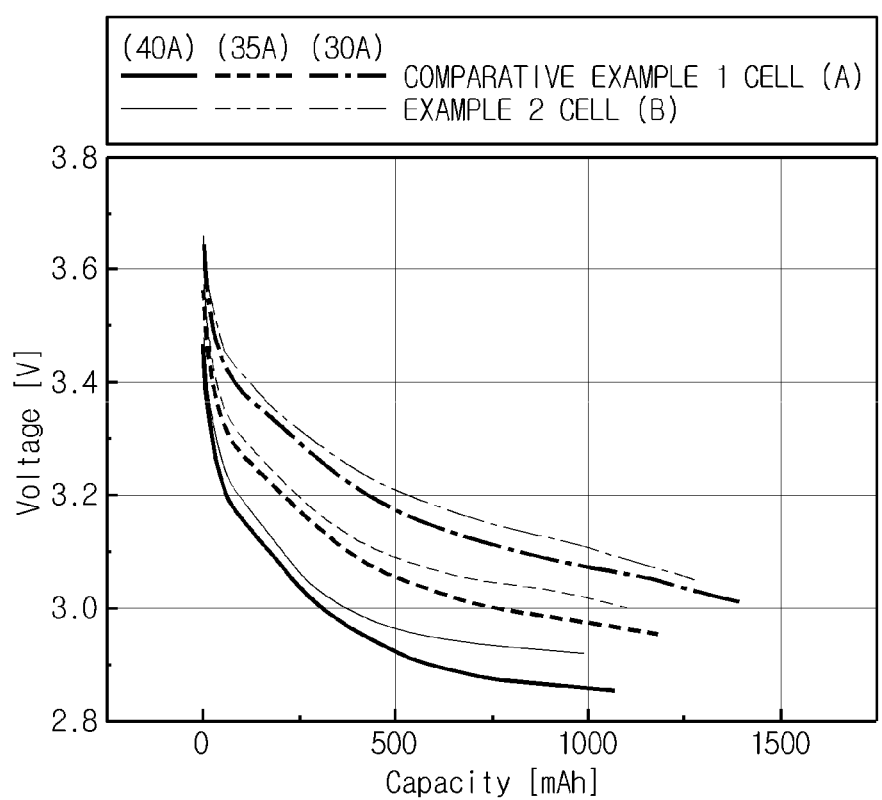
FIG. 4 is a graph showing evaluation of discharge characteristics of cylindrical cells using electrode active material slurries according to Example and Comparative example.

FIG. 4 is a graph showing evaluation of discharge characteristics of a cylindrical cell (A) using the electrode active material slurry prepared in the comparative example 1 and a cylindrical cell (B) using the electrode active material slurry prepared in the example 2.

Referring to FIG. 4, in the case of discharge profiles, when high voltage is maintained during discharging, good performance is ensured, and accordingly, it can be seen that the B cell according to the example of the present disclosure has better discharge characteristics than the A cell.

The foregoing disclosure is only provided to illustrate the technical aspects of the present disclosure, and it will become apparent to those skilled in the art that various changes and modifications may be made without departing from the essential features of the present disclosure. Accordingly, it should be understood that the embodiments disclosed herein are intended to describe the technical aspects of the present disclosure, not to limit the scope of the present disclosure. The scope of protection of the present disclosure shall be defined by the claims, and all technical aspects equivalent thereto shall be construed as falling within the scope of protection of the present disclosure.

What is claimed is:

1. A method of preparing an electrode active material slurry, comprising:
   (S1) mixing a conductive agent, a binder and a first dispersion medium to prepare a conductive agent dispersion consisting essentially of the conductive agent, the binder and the first dispersion medium, said conductive agent dispersion containing 5 wt % to 20 wt % of the conductive agent dispersed therein, and mixing an electrode active material and a second dispersion medium to prepare an electrode active material dispersion, said electrode active material dispersion consisting essentially of 60 wt % to 90 wt % of the electrode active material dispersed therein; and
   (S2) dispersing the conductive agent dispersion while adding the conductive agent dispersion to the electrode active material dispersion, wherein the first dispersion medium includes any one selected from the group consisting of organic solvents with a solubility parameter (δ) constant value higher than or equal to 10, or mixtures thereof, wherein the second dispersion medium includes any one selected from the group consisting of organic solvents with a solubility parameter (δ) constant value higher than or equal to 10, or mixtures thereof, and wherein at the step S2, 10 to 40 parts by weight of the conductive agent dispersion is added to and dispersed in the electrode active material dispersion based on 100 parts by weight of the electrode active material dispersion.

2. The method of preparing an electrode active material slurry according to claim 1, wherein the binder is any one selected from the group consisting of polyvinylidene fluoride-hexafluoropropylene (PVDF-co-HFP), polyvinylidene fluoride (PVDF), polyacrylonitrile, polymethyl methacrylate, styrene butadiene rubber (SBR), and carboxyl methyl cellulose (CMC), or mixtures thereof.

3. The method of preparing an electrode active material slurry according to claim 1, wherein the conductive agent includes any one selected from the group consisting of carbon black, graphite, carbon fibers, carbon nanotubes, acetylene black, Ketjen Black, and Super P, or mixtures thereof.

4. The method of preparing an electrode active material slurry according to claim 1, wherein the first dispersion medium includes water, N-Methyl-2-pyrrolidone, or mixtures thereof.

5. The method of preparing an electrode active material slurry according to claim 1, wherein the electrode active material is a positive electrode active material or a negative electrode active material.

6. The method of preparing an electrode active material slurry according to claim 5, wherein the positive electrode active material includes lithium containing oxide.

7. The method of preparing an electrode active material slurry according to claim 6, wherein the lithium containing oxide is lithium containing transition metal oxide.

8. The method of preparing an electrode active material slurry according to claim 7, wherein the lithium containing transition metal oxide is any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0≤y<1$), $Li_xNi_{1-y}Mn_yO_2$ ($0.5<x<1.3$, $O≤y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$) and $Li_xFePO_4$ ($0.5<x<1.3$), or mixtures thereof.

9. The method of preparing an electrode active material slurry according to claim 5, wherein the negative electrode active material includes a lithium metal, a carbon material, a metal compound, and mixtures thereof.

10. The method of preparing an electrode active material slurry according to claim 9, wherein the metal compound is a compound containing any one type of metal element selected from the group consisting of Si, Ge, Sn, Pb, P, Sb, Bi, Al, Ga, In, Ti, Mn, Fe, Co, Ni, Cu, Zn, Ag, Mg, Sr, and Ba, or compounds or mixtures of two or more types of metal elements.

11. The method of preparing an electrode active material slurry according to claim 1, wherein the step S2 comprises additionally feeding a third dispersion medium while adding the conductive agent dispersion to the electrode active material dispersion.

12. The method of preparing an electrode active material slurry according to claim 11, wherein the third dispersion medium includes any one selected from the group consisting of organic solvents with a solubility parameter (δ) constant value higher than or equal to 10, or mixtures thereof.

13. An electrode active material slurry prepared by a preparing method according to claim 1.

14. The method of preparing an electrode active material slurry according to claim 1, wherein the electrode active material slurry has a viscosity in the range from greater than 10,000 cP to 15,000 cP or less at a shear rate of 1 $s^{-1}$.

* * * * *